E. C. PORTER.
ICE CAKE SPLITTING APPARATUS.
APPLICATION FILED APR. 1, 1912.

1,128,507.

Patented Feb. 16, 1915.
2 SHEETS—SHEET 1.

Witnesses:
H. B. Davis.
H. McDonald

Inventor:
Emmons C. Porter
by Rogers & Harriman
Attys.

E. C. PORTER.
ICE CAKE SPLITTING APPARATUS.
APPLICATION FILED APR. 1, 1912.

1,128,507.

Patented Feb. 16, 1915.

2 SHEETS—SHEET 2.

Witnesses:
H. B. Davis
H. McDonald

Inventor:
Emmons C. Porter
by Hoyt & Henman
Attys

THE NORRIS PETERS CO., PHOTO-LITHO., WASHINGTON, D. C.

UNITED STATES PATENT OFFICE.

EMMONS C. PORTER, OF BROCKTON, MASSACHUSETTS.

ICE-CAKE-SPLITTING APPARATUS.

1,128,507. Specification of Letters Patent. Patented Feb. 16, 1915.

Application filed April 1, 1912. Serial No. 687,781.

*To all whom it may concern:*

Be it known that I, EMMONS C. PORTER, a citizen of the United States, residing at Brockton, in the county of Plymouth and State of Massachusetts, have invented an Improvement in Ice-Cake-Splitting Apparatus, of which the following is a specification.

In harvesting ice, it is usually the practice to cut the ice in square cakes and deliver them to the ice-house in this condition. In order, however, that delivery to consumers may be facilitated, it is customary to split these cakes in halves, before they are placed on the delivery wagons or trucks, and this has usually been done by hand. While these square cakes are sometimes grooved in the middle and split before they are delivered to the conveying chain, this method is objectionable for various reasons, particularly as it is difficult and practically impossible to feed the split cakes to the chain as rapidly as the chain can convey them, and, when it is necessary to plane down the ice while it is being lifted by the conveying chain, it is particularly difficult to do this if they have previously been split.

Figure 1:
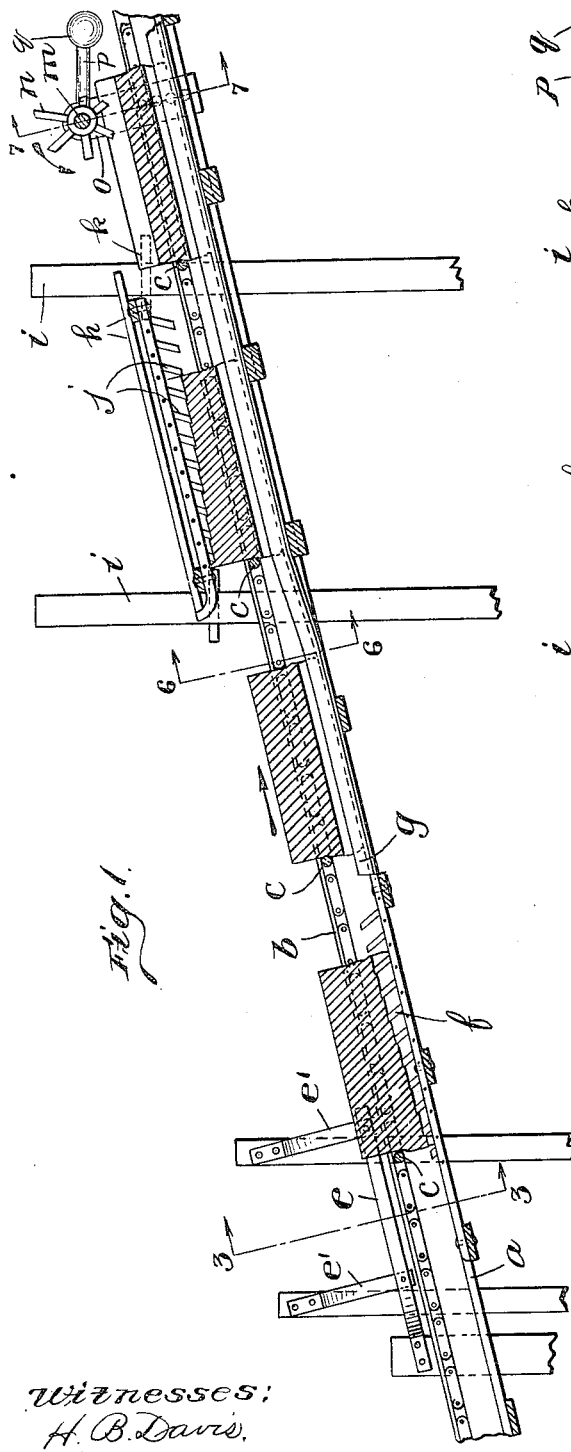
Figure 2:
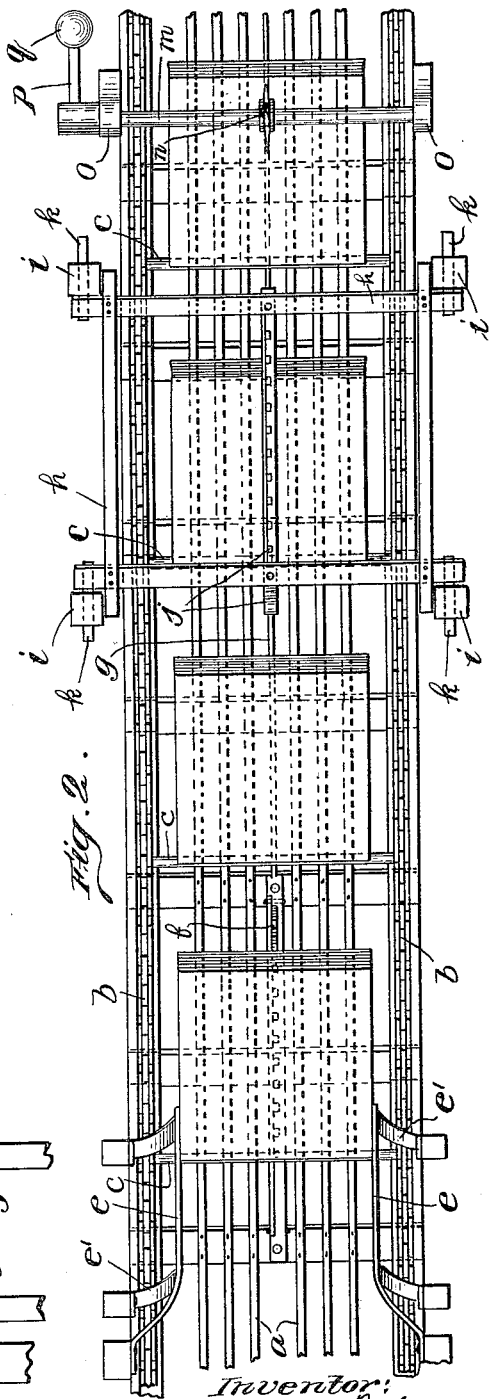
Figure 3:
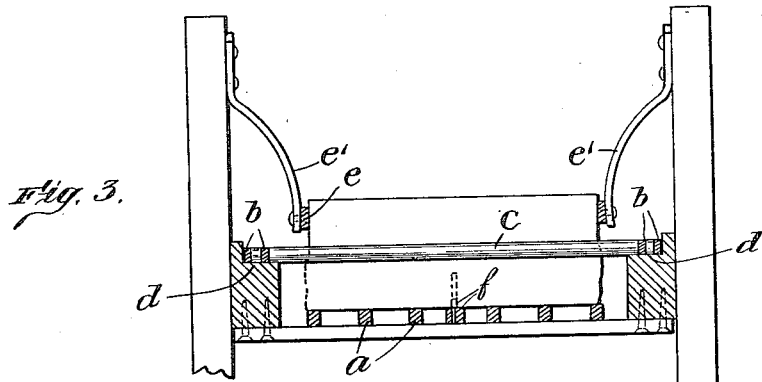
Figure 4:
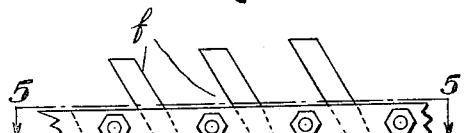
Figure 5:
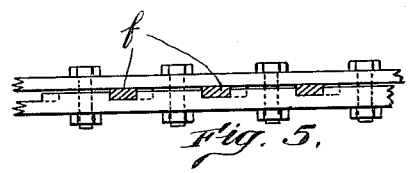
Figure 6:
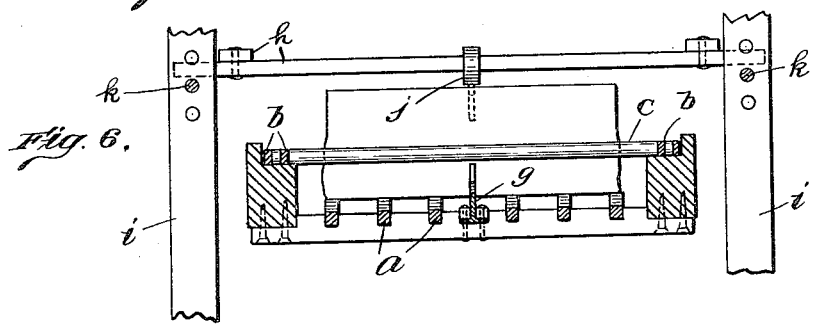
Figure 7:
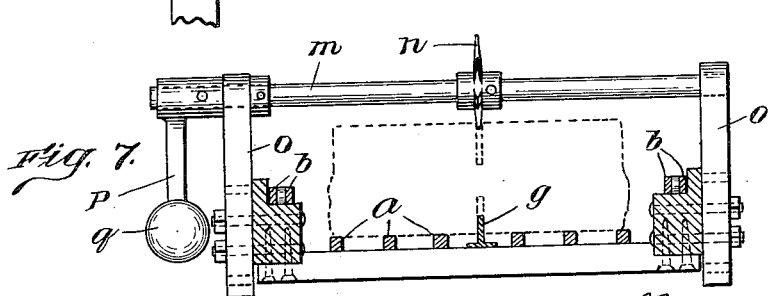
Figure 8:
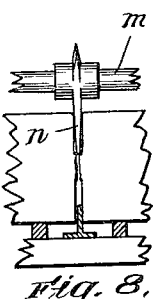
Figure 9:
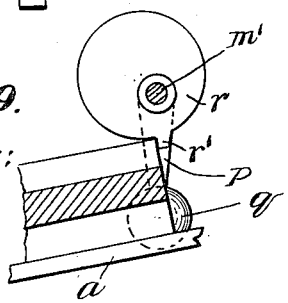
Figure 10:
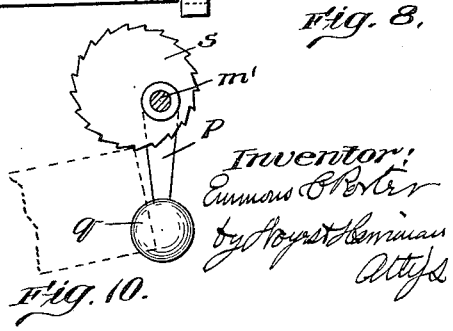

The object of my invention is to provide means for automatically splitting the square cakes while they are being lifted by the conveying chain, and after they have been planed to the required thickness, so that the cakes may be delivered to the ice-house in condition to be subsequently delivered to the consumer, splitting of the cakes by hand being thus avoided. I accomplish this object by the means shown in the accompanying drawing, in which, Figure 1 is a longitudinal sectional view of a portion of an elevating apparatus for raising ice cakes into an ice-house, and provided with my invention. Fig. 2 is a plan view thereof. Fig. 3 is a cross-sectional view on the line 3—3 Fig. 1. Figs. 4 and 5 are detail views of portions of the groover. Fig. 6 is a cross-sectional view at the line 6—6 Fig. 1. Fig. 7 is a cross-sectional view at the line 7—7 Fig. 1. Fig. 8 is a detail view of an ice splitter which I employ, and Figs. 9 and 10 are views of modified forms of similar devices.

In the drawing $a$ indicates the bars which usually form the bottom of the inclined runway upon which the ice cakes rest as they are raised to an ice-house. An endless conveyer, of usual form, is illustrated which comprises the usual chains $b$ having connecting cross-bars $c$ spaced at suitable intervals. The chains are shown as resting on supports $d$ at opposite sides of the runway, as is customary.

According to my invention I provide a pair of guide-plates $e$ at opposite sides of the runway, said plates being arranged at a convenient distance above the point at which the planer (not shown) is located, and extending convergently from the side supports and then parallel to the sides of the runway. Said plates $e$ are preferably supported by strong flat springs $e'$, so that they may yield, to a certain extent, if necessary. The distances between the parallel portions of the plates $e$ correspond as nearly as possible to the width of the cakes of ice which are to be conveyed up the runway, so that, when a cake is lifted by the chain, if it is not held centrally of the runway, it will be pushed crosswise thereof to such a position by one of the plates $e$.

Mounted on the bars $a$ in a vertical plane, midway between the plates $e$ and parallel thereto, is an ice groover, which comprises a series of rigidly mounted grooving blades $f$, extending from a point at a suitable distance below the upper end of the plates $e$ to a point some distance thereabove. The blades $f$ are gradually increased in length from the lowermost to the uppermost, and, when thus arranged, will cut a groove in the middle of the under side of a cake of ice, as it is carried upward by the conveying chain, each blade thus being arranged to cut the groove slightly deeper than the preceding, so that a groove of the depth corresponding to the distance which the longest blade, or last of the series, extends above the surface of the bars $a$, will be formed in the cake. The groove thus cut in the bottom of the cake will extend from end to end and in the middle thereof.

A guiding rib $g$ is mounted on the bottom of the runway in alinement with the grooving blades $f$ and extends from a point adjacent the uppermost of said blades $f$ to a point some distance thereabove, as hereafter described. Said rib is preferably of iron and is of a width and height slightly less than the width and depth of the groove which will be cut in the ice cake by the grooving blades $f$, so that, as the cake is carried upward by the conveyer, said groove will receive the guiding rib $g$, and said rib will guide the cake in exact alinement with said blades and will not permit it to move laterally or be deflected to either side of the runway.

A frame $h$ is mounted between four posts $i$ at opposite sides of the runway, said frame being arranged to move vertically therebetween and being guided by said posts in its vertical movement. Guiding recesses are formed at the corners of the frame by having it constructed of cross-bars which extend beyond their points of intersection, so as to provide V-shaped recesses which engage the corners of the posts $i$, as best shown in Fig. 2. Pins $k$ are provided which are adapted to be inserted in a vertical series of apertures in posts $i$ and thus support the frame at the desired elevation.

A series of grooving blades $j$ are mounted in the middle of said frame $h$, said blades depending from the under side thereof, and extending longitudinally of the runway in the vertical plane of the guiding rib $g$, which is extended some distance beyond the uppermost blades of the series. Said blades $j$ are arranged so that they depend to distances which increase regularly with relation to the bottom of the runway from the lower end of the frame upward, in a manner similar to the arrangement of blades $f$.

The supporting pins are adjusted so that they will support the frame at an elevation which will permit the ice cakes to pass therebeneath in proximity thereto, so that when a cake is fed beneath the frame it will be grooved by the blades $j$ in its upper side in a manner similar to that in which it will be grooved in its under side by blades $f$.

In practice, if the thickness of the ice is such that, in order to form a groove of the desired depth in the upper side the lower ends of some of the blades $j$ would be engaged by the cross-bars $c$, the bottom of the runway may be elevated with relation to the supports $d$ to a sufficient extent to raise the cake to a point which will enable the frame to be adjusted in the necessary relation to the cakes, without having the blades $j$ engaged by the bars $c$. By this operation two grooves are formed to a desired depth in both the upper and under sides of the cake, said grooves being in the same plane, or exactly opposite each other.

A splitting device is provided which may be made in various forms, and is shown in Figs. 1 to 8 as comprising a shaft $m$ which is mounted in vertically adjustable bearings $o$ secured at opposite sides of the runway by bolts which may be inserted in any one of a vertical series of holes in the bearing supports. Said shaft $m$ is provided with a splitting blade, which in this form of my invention, is shown as comprising a series of chisels $n$, which are radially mounted thereon and have wedge-shaped ends forming edges which are all disposed in a plane perpendicular to the shaft and also the same plane as that of the blades $f$ and $j$ and guide-rib $g$. Said chisels also increase successively in length, providing, in effect, a blade having a series of edge portions each at a greater radial distance from the axis of the shaft $m$ than the preceding. Said chisels are, at a short distance from their edges, of greater thickness than the width of the grooves which are cut by blades $f$ and $j$, so that they may cause a wedging action when forced therein.

An arm $p$, having a weight $q$ on the end thereof, is secured to said shaft $m$, the combined weights thereof being sufficient to turn the shaft to a normal position when the shaft is rotated from said position. Said arm is so arranged with relation to the shortest chisel of the series that they extend approximately parallel, and when the shaft is held in its normal position by the gravity of the arm $p$ and weight $q$, said chisel will depend perpendicularly. Said guide-rib $g$ is extended beneath the shaft $m$, so that when the previously grooved cake is fed by the chain beneath the splitting device, the cake will be held so that the grooves therein will be in the plane of the chisels $n$.

The shaft $m$ is vertically adjusted with relation to the upper surface of the ice cakes which are fed therebeneath, so that the shortest chisel of the series will extend some distance below the upper surface of the ice cakes, and also to such a distance that the thickness of the chisel, at the level of the upper surface of the ice cakes, is somewhat greater than the width of the grooves which have been cut therein. As the cakes are held in an inclined position, the first or shortest chisel will extend somewhat obliquely toward the surface of the cake, so that, when a cake is fed beneath the shaft $m$, the sides of the cake, at the opposite sides of its groove, will engage this chisel, and, as the cake is moved along, it will cause it to be swung to and beyond a position perpendicular to the surface of the cake, causing corresponding rotation of the shaft $m$. This movement will cause the next chisel to be swung down into the groove, so that it becomes wedged therein, and, as the cake is fed along, this chisel is likewise brought to and carried beyond a perpendicular position with relation to the surface of the cake, and the next chisel will, in the meantime, have been moved into engagement with the sides of the groove in like manner. This operation will be repeated with the successive chisels, and, as they are of increasing lengths, it will be apparent that each succeeding chisel will be forced into the groove to a greater depth at the time it passes the perpendicular position. This operation is continued, causing an increasing wedging action, or splitting force, upon the cake until this force becomes so great that the cake is split. As the cake has been materially weakened by the formation of the grooves therein, the cleft will extend directly from the upper to the lower groove, so that the cake will be split in equal parts, as shown in Fig. 8.

As soon as the cake is split, its parts will move laterally out of engagement with the splitting device which will be returned by the weight of the parts $p$ and $q$, to its normal position. Under ordinary conditions, the cake will be split before the longer chisels are forced into the groove, so that the shaft $m$ will not be rotated far enough to carry the arm $p$ to and beyond a vertical position, in which case, the arm will merely oscillate, but in case the cake does not split until the arm is carried beyond the perpendicular position, or, in case one of the chisels should catch on the cake, the shaft will be caused to make a complete rotation before it returns to its normal position. The splitting device will, therefore, not interfere with the raising of the ice, and will always automatically return to the desired position after each cake passes. It will be observed that, while the splitting device is not directly engaged by the conveyer, it is indirectly engaged thereby through the ice cake, and all the force required to perform the splitting operation is derived from the conveyer. It is preferable to operate the splitting device by engagement with the ice cake instead of by direct engagement with the conveyer, as it will remain stationary when a conveyer bar passes which is not lifting a cake, and the movement will always bear a definite relation to the side of the particular ice cake which is being split.

In Figs. 9 and 10, I show two modified forms of splitting devices which I may employ. In the form of Fig. 6 I show a circular splitting blade $r$, eccentrically mounted on the shaft $m'$, said blade being provided with a projecting tooth $r'$ arranged in the same position with relation to the weighted arm $p$ as the shortest chisel of the series of chisels $n$, already described. The blade $r$ is of similar shape in transverse section to the chisels $n$, and its edge extends outwardly with relation to the center of the shaft from the tooth $r'$. With this construction, the end of the ice cake will engage the tooth $r'$ and cause the knife $r$ to be rotated so that its edge will be forced into the groove, and a wedging action will be caused which will be increased in force as the cake is advanced, until the cake is finally split.

In Fig. 10, I show a somewhat similar form of circular knife $s$ having a toothed, or serrated edge, said knife being eccentrically mounted on a shaft as before described. With this arrangement, the teeth of the knife will be engaged by the ice cake, and the knife will be rotated and will split the cake in a manner substantially the same as that already described.

It is desirable, in each form of splitting device which may be employed, to provide some positive means of engagement with the ice cakes, so that the shaft will always be caused to turn, otherwise the application of splitting pressure will not be secured.

I claim:—

1. In combination with an ice-cake runway, a series of ice-grooving-blades mounted to project above the bottom of the runway, longitudinally thereof, and means to guide the ice-cakes to pass thereover in a predetermined lateral position relative thereto, substantially as described.

2. In combination with a runway, a conveyer for moving ice-cakes along the runway, and means for automatically splitting the cakes as they are moved by the conveyer, substantially as described.

3. In combination with a runway, a conveyer for moving ice-cakes along the runway and a pair of ice-grooving-devices arranged respectively to engage the upper and lower sides of an ice-cake, as it is conducted along the runway to form oppositely disposed grooves therein, substantially as described.

4. In combination with a runway, a conveyer for moving ice-cakes along the runway, and two series of oppositely disposed ice-grooving blades extending longitudinally of the runway in position respectively to groove the upper and lower sides of an ice-cake as it is moved along the runway, substantially as described.

5. In combination with a runway, a conveyer for moving ice-cakes along the runway, and two series of oppositely disposed ice-grooving-blades arranged in the same plane and extending longitudinally of the runway in position respectively to groove the upper and lower sides of an ice-cake as it is moved along the runway, substantially as described.

6. In combination with a runway, a conveyer for moving ice-cakes along the runway, and two ice-grooving devices arranged in the runway at different longitudinal points thereof, one above and one below the ice-cakes to groove successively the opposite sides of the cakes as they are moved along the runway, substantially as described.

7. In combination with a runway, a conveyer for moving ice-cakes along the runway, a pair of ice-grooving devices arranged successively to groove the opposite sides of an ice-cake as it is moved along the runway, and means to guide the ice-cake as it is moved between said grooving devices, to cause said grooves to be formed in approximately the same plane, substantially as described.

8. In combination with a runway, a conveyer for moving ice-cakes along the runway, a pair of ice-grooving-devices arranged at different longitudinal points in the runway, successively, to groove the opposite sides of an ice-cake, as it is moved along the same, and a guiding-rib extending between said grooving devices and arranged in alinement with the one for first engaging the cake and in position to project into the groove formed thereby before the cake is disengaged therefrom, substantially as described.

9. In combination with a runway, means to move ice-cakes along the runway, a series of ice-grooving-blades arranged longitudinally of the runway and projecting above the ice-supporting surface thereof, to form a groove in the under side of the cake as it is moved along the runway, a guiding-rib extending longitudinally of the runway in alinement with said grooving-blades and in position to project within the groove formed thereby before the cake is disengaged therefrom, and a series of depending grooving-blades arranged to groove the upper surface of the ice-cake, said guiding-rib being extended in the plane of said depending blades to guide the cake as it is grooved thereby and cause the grooves to be formed directly opposite each other, substantially as described.

10. In combination with a runway, a conveyer for moving ice-cakes along the runway, a splitting device arranged adjacent the path of movement of the ice-cakes, and means, automatically actuated by the conveyer to move the splitting device to split the ice-cakes as they pass the same, substantially as described.

11. In combination with a runway, a conveyer for moving an ice-cake along the runway, a splitting device arranged over the runway, and means, actuated by the conveyer, to cause downward movement thereof to split the cake, as it is engaged thereby, substantially as described.

12. In combination with a runway, a conveyer for moving an ice-cake along the runway, means for automatically grooving the cake as it is moved by said conveyer, a splitting device and means for moving the same to split the cake in the plane of said groove, substantially as described.

13. In combination with a runway, a conveyer for moving an ice-cake along the runway, means for automatically grooving the cake as it is moved by said conveyer, a splitting-device, and means, automatically operated by the conveyer, to move said splitting-device to engage the cake in its groove and split the same, substantially as described.

14. In combination with a runway, a conveyer for moving ice-cakes along the runway, grooving devices disposed to form grooves in opposite sides of the cakes, and in approximately the same plane, as they are moved by said conveyer, and automatic means for thereafter splitting said cakes in the plane of said grooves, substantially as described.

15. In combination with a runway, a conveyer for moving ice-cakes along the runway, grooving-devices disposed successively to form grooves in the opposite sides of the cakes and in approximately the same plane, a splitting device, and automatic means to move said splitting-device to split the cakes in the plane of said grooves, substantially as described.

16. In combination with a runway, a splitting-device arranged over the runway, a conveyer for moving ice-cakes along the runway and beneath the splitting-device, and means, automatically actuated by the conveyer, to move the splitting-device into engagement with the ice-cakes as they are successively passed therebeneath to produce a regularly increasing downward and splitting pressure on the cake, substantially as described.

17. In combination with an ice-cake runway, an ice-splitting-device comprising a rotatably mounted shaft arranged over the runway, and a radially projecting splitting-blade mounted on said shaft, and means to rotate said shaft to swing said blade into engagement with the ice-cakes as they pass therebeneath, substantially as described.

18. In combination with an ice-cake runway, an ice-splitting-blade mounted above the runway to move about an axis at right angles to the runway and in a plane perpendicular thereto, and means to swing said blade downwardly into engagement with an ice-cake, as it is moved along the runway, substantially as described.

19. In combination with an ice-cake runway, an ice-splitting-blade mounted over the runway, means to move the ice-cakes beneath said blade, and means, automatically actuated by each ice-cake as it is moved therebeneath, to move said blade downwardly to split the cake, substantially as described.

20. In combination with an ice-cake runway, a splitting-blade mounted over the runway to move about an axis disposed transversely thereto, said blade having a projection at one side thereof, normally disposed to be engaged by an ice-cake as it is moved therebeneath to swing the blade downwardly to split the ice-cake, substantially as described.

21. In combination with an ice-cake runway, an ice-splitting-blade disposed longitudinally thereof and pivotally mounted thereover to swing vertically, means to move said blade downward as each ice-cake is moved beneath it to split the same, and means to lift the blade automatically after each splitting operation, substantially as described.

22. In combination with an ice-cake runway, an ice-splitting-blade disposed longitudinally thereof and pivotally mounted thereover to swing vertically, means to move said blade downward as each ice-cake is moved beneath it to split the same, and a counterweight for automatically lifting the blade after each splitting operation, substantially as described.

23. In combination with an ice-cake runway, an ice-splitting-device comprising a splitting-blade pivotally mounted thereover to swing about an axis disposed transversely thereto, said blade having ice-engaging edge-portions successively arranged at increasing radial distances from said axis, means to swing the edge-portions of shorter radial distances into engagement with an ice-cake, as it passes therebeneath, to cause the portions of greater radial distances to move successively into engagement with the ice-cake, and produce an increasing splitting force thereon until the cake is split, substantially as described.

24. In combination with an ice-cake runway, an ice-splitting-device comprising a freely rotatable shaft supported above the runway and extending transversely thereof, a splitting-blade perpendicularly mounted on the shaft and having edge-portions successively arranged at increasing radial distances from the axis of the shaft, a counterweight for normally holding the shaft in position to cause the edge-portions of shorter radial distances preliminarily to engage the ice-cakes, as they pass therebeneath, whereby the other portions may be successively brought into engagement therewith to split the same, substantially as described.

25. In a device of the character described, conveying means for conducting ice-cakes in a predetermined path, ice-grooving devices extending upwardly into said path and arranged longitudinally thereof, and means to guide the ice-cakes to pass thereover in a predetermined lateral position relative thereto.

26. In a device of the character described, conveying means for conducting the ice-cakes in a predetermined path, and a pair of ice-grooving devices arranged to engage the upper and lower sides of the ice-cakes as they are conducted along said path to form oppositely disposed grooves therein.

27. In a device of the character described conveying means for conducting the ice-cakes in a predetermined path, and two series of oppositely disposed ice-grooving blades extending longitudinally of said path in position respectively to groove the upper and lower sides of the ice-cakes as they are moved along said path.

28. In a device of the character described, conveying means for conducting the ice-cakes in a predetermined path, and two series of oppositely disposed ice-grooving blades arranged in said path and extending longitudinally thereof in position respectively to groove the upper and lower sides of the ice-cakes as they are moved along said path.

29. In a device of the character described, conveying means for conducting the ice-cakes in a predetermined path, and ice-grooving devices arranged in said path at different longitudinal points therein, one above and one below said path in position to cut a groove successively in the opposite side of the cakes as they are moved along said path.

30. In a device of the character described conveying means for conducting the ice-cakes in a predetermined path, and a pair of ice-grooving devices arranged successively to groove the opposite sides of the ice-cakes, as they are moved along said path, and means to guide the cakes as they are moved between said grooving devices to cause said grooves to be formed in approximately the same plane.

31. A device of the character described, having a passage way through which ice cakes are moved in a predetermined path, and ice-grooving devices extending upwardly into said passage way, and arranged longitudinally thereof to form corresponding grooves in the under side of the cakes as they pass thereover.

32. A device of the character described, having a passage way through which ice cakes are moved in a predetermined path, a pair of ice-grooving devices, arranged to engage the upper and lower sides of the ice cakes at directly opposite points, as said cakes move along said path to form oppositely disposed grooves therein.

33. A device of the character described, having a passage way through which ice cakes are moved in a predetermined path, two series of oppositely disposed ice-grooving blades extending longitudinally of said path in position respectively to form grooves, one directly over the other, in the upper and lower sides of the ice cakes, as the cakes are moved along said path.

34. A device of the character described, having a passage way through which ice cakes are moved in a predetermined path, two series of oppositely disposed ice-grooving blades arranged in the same vertical plane and extending longitudinally of said path in position respectively to groove the upper and lower sides of ice cakes, as they are moved along said path.

35. A device of the character described, having a passage way through which the ice cakes are moved in a predetermined path, ice-grooving devices arranged in said path at different longitudinal points thereof, one above and one below said path in positions to cut a groove successively in the opposite sides of the cakes, at directly opposite points, as they are moved along said path.

36. A device of the character described, having a passage way through which ice cakes are moved in a predetermined path, a pair of ice-grooving devices respectively supported, one above, and one below said path, and projecting into said path in approximately the same plane in position to cut a groove in the opposite sides of the ice cakes as they are moved along said path.

In testimony whereof, I have signed my name to this specification in the presence of two subscribing witnesses.

EMMONS C. PORTER.

Witnesses:
L. H. HAMMAN,
H. B. DAVIS.